United States Patent
Nayshtut et al.

(10) Patent No.: US 11,004,168 B2
(45) Date of Patent: *May 11, 2021

(54) OPTICAL FEEDBACK FOR VISUAL RECOGNITION AUTHENTICATION

(71) Applicant: McAfee, LLC, San Jose, CA (US)

(72) Inventors: Alex Nayshtut, Gan Yanve (IL); Igor Muttik, Berkhamsted (GB); Oleg Pogorelik, Lapid (IL); Adam Marek, Gdansk (PL)

(73) Assignee: MCAFEE, LLC, San Jose, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 16/370,455

(22) Filed: Mar. 29, 2019

(65) Prior Publication Data

US 2019/0228496 A1 Jul. 25, 2019

Related U.S. Application Data

(63) Continuation of application No. 15/348,079, filed on Nov. 10, 2016, now Pat. No. 10,296,998.

(51) Int. Cl.
*G06K 9/00* (2006.01)
*G06T 1/00* (2006.01)
*H04L 29/06* (2006.01)

(52) U.S. Cl.
CPC ........ *G06T 1/0021* (2013.01); *G06K 9/00577* (2013.01); *G06K 9/00899* (2013.01);
(Continued)

(58) Field of Classification Search
None
See application file for complete search history.

(56) References Cited

U.S. PATENT DOCUMENTS

| | | | |
|---|---|---|---|
| 6,370,272 B1 * | 4/2002 | Shimizu | G06T 1/0071 382/232 |
| 6,947,571 B1 * | 9/2005 | Rhoads | G06Q 30/02 382/100 |

(Continued)

FOREIGN PATENT DOCUMENTS

WO 2016077590 5/2016

OTHER PUBLICATIONS

Smith et al., "Binary Watermarks: A Practical Method to Address Face Recognition Replay Attacks on Consumer Mobile Devices," 2015 IEEE International Conference on Identity, Security and Behavior Analysis (ISBA), Jul. 27, 2015 (Year: 2015).*

(Continued)

*Primary Examiner* — Soo Shin
(74) *Attorney, Agent, or Firm* — Hanley, Flight & Zimmerman, LLC

(57) ABSTRACT

Providing optical watermark signals for a visual authentication session by performing at least the following: receive, at an anti-spoof engine, an instruction to perform visual authentication operations for a visual authentication session, generate, with the anti-spoof engine, an optical watermark signal based on receiving the instruction, wherein the optical watermark signal includes at least one optical identifier to authenticate images captured during the visual authentication session, obtain, with the anti-spoof engine, an image source that includes captured images of the visual authentication session, determine, with the anti-spoof engine, whether the image source includes a reflected optical watermark signal, and compare, with the anti-spoof engine, whether the reflected optical watermark signal matches the generated optical watermark signal based on the determination that the image source includes the reflected optical watermark signal.

20 Claims, 8 Drawing Sheets

(52) U.S. Cl.
CPC .......... *G06K 9/00906* (2013.01); *H04L 63/08* (2013.01); *G06K 2009/0059* (2013.01)

(56) References Cited

U.S. PATENT DOCUMENTS

| | | | | |
|---|---|---|---|---|
| 7,444,506 | B1* | 10/2008 | Datta | H04L 63/0428 370/238 |
| 2002/0095586 | A1* | 7/2002 | Doyle | G06F 21/32 713/186 |
| 2003/0005304 | A1* | 1/2003 | Lawandy | G11B 20/00876 713/176 |
| 2003/0037075 | A1* | 2/2003 | Hannigan | G06T 1/0021 715/201 |
| 2005/0018848 | A1* | 1/2005 | Aoyama | G11B 20/1262 380/255 |
| 2014/0297530 | A1* | 10/2014 | Eckel | G06Q 20/4014 705/44 |
| 2014/0363057 | A1* | 12/2014 | Eckel | G06Q 50/265 382/116 |
| 2016/0140405 | A1* | 5/2016 | Graumann | G06K 9/00288 382/118 |
| 2017/0118372 | A1* | 4/2017 | Lee | H04N 1/00846 |
| 2018/0130168 | A1 | 5/2018 | Nayshtut et al. | |

OTHER PUBLICATIONS

International Searching Authority, "International Searching Authority and Written Opinion", issued in connection with International Application No. PCT/US2017/055936, dated Jan. 23, 2018, 14 pages.

United States Patent and Trademark Office, "Non-Final Office Action", issued in connection with U.S. Appl. No. 15/348,079 dated Apr. 19, 2018, 22 pages.

United States Patent and Trademark Office, "Final Office Action", issued in connection with U.S. Appl. No. 15/348,079 dated Oct. 1, 2018, 35 pages.

United States Patent and Trademark Office, "Notice of Allowance and Fee(s) Due", issued in connection with U.S. Appl. No. 15/348,079 dated Jan. 14, 2019, 30 pages.

* cited by examiner

OPTICAL FEEDBACK FOR VISUAL RECOGNITION AUTHENTICATION

RELATED APPLICATION

This patent arises from a continuation of U.S. patent application Ser. No. 15/348,079, which was filed on Nov. 10, 2016. U.S. patent application Ser. No. 15/348,079 is hereby incorporated herein by reference in its entirety. Priority to U.S. patent application Ser. No. 15/348,079 is hereby claimed.

TECHNICAL FIELD

Embodiments described herein generally relate to visual recognition authentication, and in particular for emitting an optical watermark signal to authenticate visual images captured for visual recognition authentication.

BACKGROUND ART

Protecting against computing security threats and preventing unauthorized access to confidential information are a common and growing concern in today's information technology (IT) systems. Computing security threats are typically designed to perform a variety of intrusive functions that include, but are not limited to, disrupting computer operations, gathering personal and confidential information, and gaining access to private computing and network systems. To perform these intrusive functions, computing security threats exploit vulnerabilities and/or security lapses within the software (e.g., operating systems and web browsers) and/or hardware of a computing system. For example, in regards to facial recognition technology, a computing system may include a camera that captures one or more images for the purposes of identifying one or more individuals. In some instances, the computing system may use the facial recognition technology to verify and authenticate whether a user should gain access to the computing system, other computing systems, and/or other restricted sites (e.g., a restricted physical area or private network). Unfortunately, facial recognition technology are susceptible to security issues, such as replay attacks and liveness issues that could allow attackers to obtain unauthorized access to secure or restricted information and restricted sites.

To prevent unauthorized access, facial recognition computing systems are often equipped to perform a variety of authentication operations. In particular, to prevent replay attacks, which can occur by presenting previously recorded images to a camera, a facial recognition computing system may perform a variety of authentication operations that reduce the risk of being compromised. For example, the facial recognition computing system may implement a multi-factor authentication process, monitor three dimensional (3D) and liveness indicators, such as eye movement, that prevent the use of a static image to gain access, and/or request a user to perform randomly selected user-actions (e.g., moving a user's head up and down), during an authentication session. However, current facial recognition computing system are typically complex and/or time consuming for a user. For instance, having a facial recognition computing system that accurately recognizes and authenticates a user's movements can be computational expensive. As such, improving technology that not only detects for visual authentication recognition attacks, but also provides a more user-friendly authentication process remains valuable in protecting sensitive and confidential information within an IT environment.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
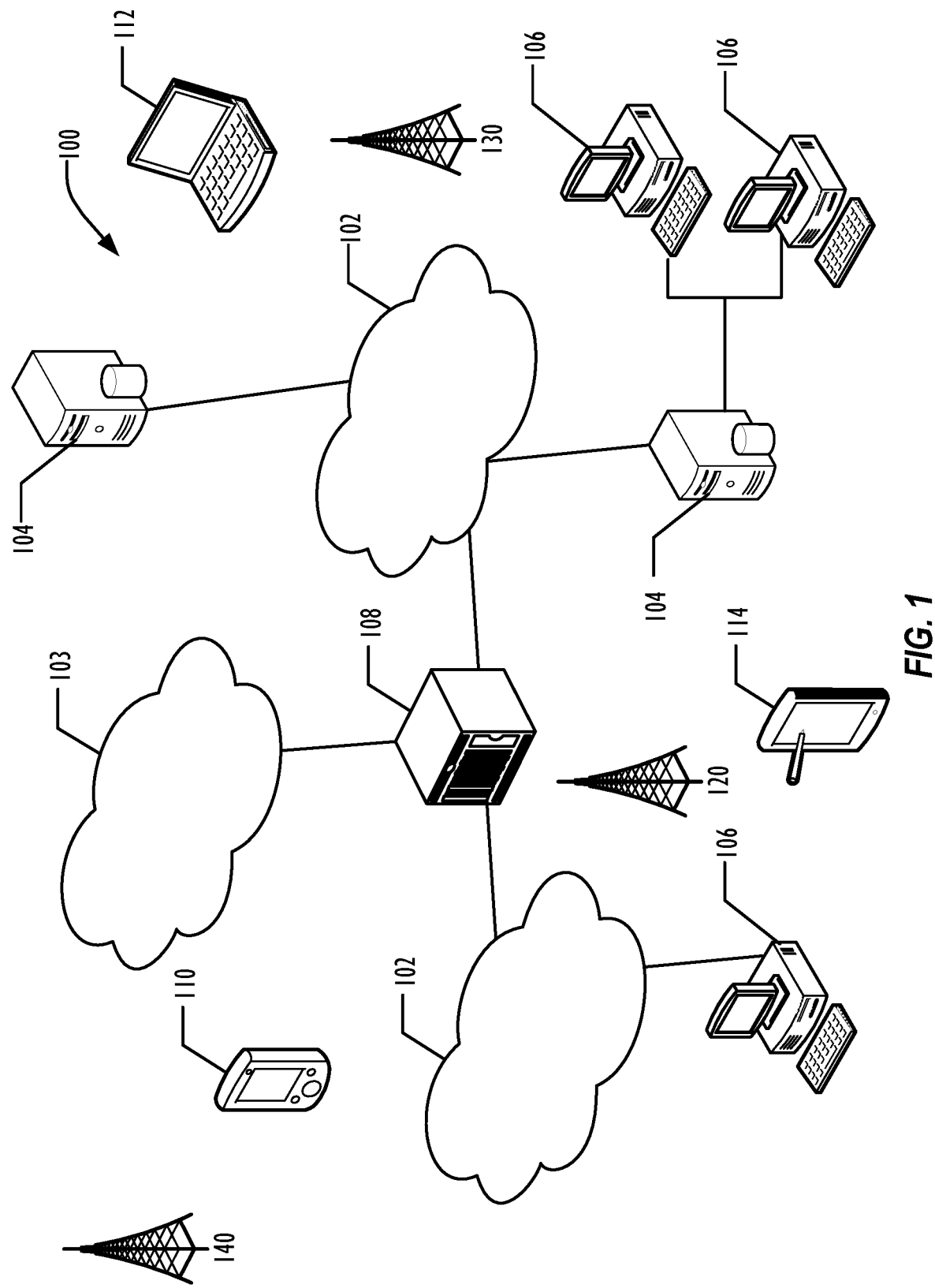
FIG. 1 is a schematic diagram of an embodiment of a network infrastructure where embodiments of the present disclosure may operate herein.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "computing system" can refer to a single computing device that includes, but is not limited to, a mobile device, computer, laptop, host, virtual machine (VM), container, tenant, server, and/or network device, or to a plurality of computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "image capturing device" refers to a physical device that includes at least one lens assembly and one or more sensor elements to capture an image. The image capturing device may also include other image circuitry and/or reflective elements (e.g., mirrors) utilized to capture the image. Example embodiments of an image capturing device include, but are not limited to scanners, digital cameras embedded within an electronic device (e.g., mobile phones), standalone digital cameras, and video recorders. Unless otherwise specified term "image capturing device" may be interchanged and considered synonymous throughout this disclosure with the term "camera."

As used herein, the term "optical watermark signal" refers to an optical identifier that is emitted into a scene prior to a camera capturing the scene. In one embodiment, the optical watermark signal is emitted at wavelengths of light that is not typically visible or detectable by a human eye. Visible light corresponds to wavelengths of the light that range from about 400 to 700 nanometers (nm). For example, the optical watermark signal may be emitted as infrared light, which falls in the wavelength range of about 700 to 1000 nm, and thus is not visible or detectable by a human eye. Additionally or alternatively, the optical watermark signal may include a modulated optical signal that may be emitted as light detectable and/or undetectable by a human eye.

This disclosure includes various example embodiments that authenticate image sources using optical watermark signals to create optical feedback. During a visual authentication session, a user may position one or more biometric elements (e.g., human face or hand) in front of an image capturing device, in some embodiments, responsive to a request from a computing system. To implement optical feedback, the computing system may emit one or more optical watermark signals that include a modulated light and/or an optical pattern into the scene for a specified amount of time (e.g., about one second). Additionally or alternatively, the optical watermark signal may be encoded with one or more various data elements, such as timestamp information, a unique computer identifier (ID), and/or randomly generated numbers. While emitting the optical watermark signal, the computing system may subsequently capture the presence and properties of a reflected optical watermark signal as part of the image source. By doing so, the image capturing device not only captures biometric elements and/or other objects within the scene, but also the reflected optical watermark signal. Once the computing system receives the image source, the computing system analyzes the image source to extract the reflected optical watermark signal. When analyzing the image source, if the computing system is unable to detect a reflected optical watermark signal and/or if the extracted optical watermark signal fails to match the emitted optical watermark signal, then the computing system may deny the user access and/or abort any remaining visual authentication operations. If the computing system is able to determine that the information within the extracted watermark signal matches information encoded in the emitted optical watermark signal, then the computing system may grant a user access and/or continue with the visual authentication operations, such as proceeding to authenticate the biometric elements within the image source.

FIG. 1 is a schematic diagram of an embodiment of a network infrastructure 100 where embodiments of the present disclosure may operate. Network infrastructure 100 comprises a plurality of computer networks 102, where each of the computer networks 102 may contain a number of other devices typically referred to as Internet of Things (microcontrollers, embedded systems, industrial control computing modules, etc.). Specifically, computer networks 102 comprise one or more different types of computer networks available today, such as the Internet, enterprise networks, data centers, a wide area networks (WAN), and/or a local area networks (LAN). Each of these networks within computer networks 102 may contain wired and/or wireless programmable devices that operate in the electrical and/or optical domain, and also employ any number of network communication protocols (e.g., TCP/IP). For example, one or more of the networks within computer networks 102 may be a wireless fidelity (Wi-Fi®) network, a Bluetooth® network, a Zigbee® network, and/or any other suitable radio based network as would be appreciated by one of ordinary skill in the art upon viewing this disclosure.

The networks within computer networks 102 may also comprise switches, routers, and/or other network hardware devices configured to transport data over computer networks 102. Moreover, one or more of the networks within computer networks 102 may be configured to implement computer virtualization, such as virtual private network (VPN) and/or cloud based networking. FIG. 1 illustrates that computer networks 102 may be connected to computers 106, computer servers 104, and one or more network nodes 108, which include, but are not limited to, gateways, routers, and/or wireless access points. The computers 106 and/or computer servers 104 may each comprise a plurality of VMs, containers, and/or other types of virtualized computing systems for processing computing instructions and transmitting and/or receiving data over computer networks 102. For example, the computers 106 and computer server 104 may be configured to support a multi-tenant architecture, where each tenant may implement its own secure and isolated virtual network environment. Although not illustrated in FIG. 1, the network infrastructure 100 may connect computer networks 102 to a variety of other types of computing device, such as VMs, containers, hosts, storage devices, electronic devices (e.g., wearable electronic devices), and/or any other electronic device capable of transmitting and/or receiving data over computer networks 102. The functionality of the network node 108 may be implemented in any device or combination of devices illustrated in FIG. 1; however, most commonly is implemented in a firewall or intrusion protection system in a gateway or router.

As shown in FIG. 1, network infrastructure 100 may also comprise a cellular network 103 for use with mobile communication devices. The cellular network 103 may be capable of supporting of a variety of devices that include, but are not limited to computers, laptops, and/or a variety of mobile devices (e.g., mobile phones). Using FIG. 1 as an example, devices in the network infrastructure 100 may communicate via the cellular network 103 are illustrated as mobile phones 110, laptops 112, and tablets 114. A mobile device, such as mobile phone 110, may interact with one or more mobile provider networks as the mobile device moves, typically interacting with a plurality of mobile network towers 120, 130, and 140 for connecting to the cellular network 103. Although referred to as a cellular network 103 in FIG. 1, a mobile device may interact with towers of more than one provider network, as well as with multiple non-cellular devices such as network node 108. In addition, the mobile devices 110, 112, and 114 may interact with non-mobile devices such as computers 104 and computer servers 106 for desired services.

In one or more embodiments, one or more mobile devices (e.g., mobile phones 110, laptops 112, and tablets 114), computer servers 104, computers 106, and/or other devices may support trusted operations through the employment of a trusted execution environment (TEE). For example, a TEE may implemented using Intel® Software Guard Extensions (SGX), Intel® Converged Security Engine (CSE), Intel® Virtualization Technology, Advanced RISC Machines (ARM®) TrustZone®, Hardware Security Module, and/or Intel® Manageability Engine (ME). Trusted networks may be formed dynamically using trusted discovery which allows trusted network devices to discover other trusted network devices, or trusted network nodes, that include a trusted entity. For purposes of the current disclosure, trusted networks may be formed by any means that allow services on trusted devices to remain opaque to network devices that are not part of the trusted network. Whereas untrusted discovery may reveal whether a particular node or network device may support trusted discovery, trusted discovery may be necessary to reveal additional trusted capabilities and services among trusted devices. Some examples of protocols that may be revealed only by trusted discovery include attestation, key agreement, group formation, trusted proxy, and provisioning.

Using FIG. 1 as an example, one or more mobile devices (e.g., mobile phones 110, laptops 112, and tablets 114), computer servers 104, and/or computers 106, may include an anti-spoof engine that operates within a trusted environment (e.g., a TEE) and may be part of a visual authentication session, such as a biometric authentication session. Other devices that are not shown in FIG. 1 that may also include the anti-spoof engine include access control devices, such as a door control systems, and/or other common security control devices. The anti-spoof engine may store and/or have access to multiple optical patterns (e.g., a list of optical patterns) and/or various data element information, such as timestamp information, geolocation coordinates (e.g., global positioning system (GPS) coordinates), unique computer identifiers, random numbers, and/or one time password (OTP) sequences. The data element information is indicative of watermarks used to authenticate images obtained from a visual authentication session. For a given visual authentication session, the anti-spoof engine may select one or more optical patterns and/or data elements to create an optical watermark signal. The anti-spoof engine may provide instructions and/or modify the projection of a light source based on the selected optical patterns and/or data elements. For example, the anti-spoof engine may select a dot grid pattern for the light source to project into a scene. The dot grid pattern may be configured to include different grid spacing in order to encode data element information within the optical pattern. Additionally or alternatively, the light source or another light source may project a modulated optical signal (e.g., amplitude modulated optical signal) that could also include data element information. The optical pattern and modulated optical signal may be projected using the same or different wavelength of lights. During image capturing operations, the light source projects the optical pattern and/or modulated light into the scene for a predetermined time period while the image capturing device captures the image source.

In one embodiment, using the anti-spoof engine, the one or more mobile devices (e.g., mobile phones 110, laptops 112, and tablets 114), computer servers 104, and/or computers 106 may encode data element information within the optical watermark signal. In one embodiment, the anti-spoof engine may encode the data element information as hash values and/or encrypt the data element information. The anti-spoof engine may create hash values for data element information using hashing operations known by persons of ordinary skill in the art, such as Secure Hash Algorithm 2 (SHA-2), message-digest 5 (MD5), and Secure Hash Algorithm 3 (SHA-3). Specifically, the anti-spoof engine may create hash values for one or more types of data elements, such as timestamp information, geolocation coordinates (e.g., GPS coordinates), unique computer ID, and/or OTP sequences. Additionally or alternatively, the anti-spoof engine may enhance security of the data element information by obtaining one or more security keys within a key manager to encrypt and sign the various data element information and/or hash values. Afterwards, the anti-spoof engine uses the processed and/or secure data element information to modify the light the light source projects into the scene.

After capturing and in some instances prior to authenticating one or more visual elements (e.g., biometric elements) within the image sources, the anti-spoof engine may obtain the captured image source from an image capturing device. The anti-spoof engine may analyze the captured image source in an attempt to detect and extract a reflected optical watermark signal within the captured image source. In instances where the anti-spoof engine fails to detect a reflected optical watermark signal, the anti-spoof engine may instruct the mobile devices, computer servers 104, and/or computers 106 to abort any remaining visual authentication operations and/or deny user authentication. If the anti-spoof engine is able to detect a reflected optical watermark signal, the anti-spoof engine may decode and extract the reflected optical watermark signal.

In one embodiment, the extracted watermark signal may include a reflected optical pattern that the anti-spoof engine attempts to match with an expected optical pattern used to encode the emitted optical watermark signal. Additionally or alternatively, the anti-spoof engine may obtain the extracted data element information encoded within the optical pattern and/or modulated optical signal and compare the extracted data element information with the expected data element information. If the extracted watermark signal fails to match the expected watermark signal, the anti-spoof engine may instruct the mobile devices, computer servers 104, and/or computers 106 to abort any remaining visual authentication operations, deny user access, and/or take any other desired action, such as generating an alarm. For example, if the expected watermark signal includes both an optical pattern and data element information, a mismatch may occur if the extracted optical pattern and/or extracted data element information fail to match the expected optical pattern and/or the expected data element information, respectively. Otherwise, if the extracted watermark signal matches the expected watermark signal, the anti-spoof engine the mobile devices, computer servers 104, and/or computers 106 may authenticate a user and/or continue with other visual authentication operations.

Figure 2:
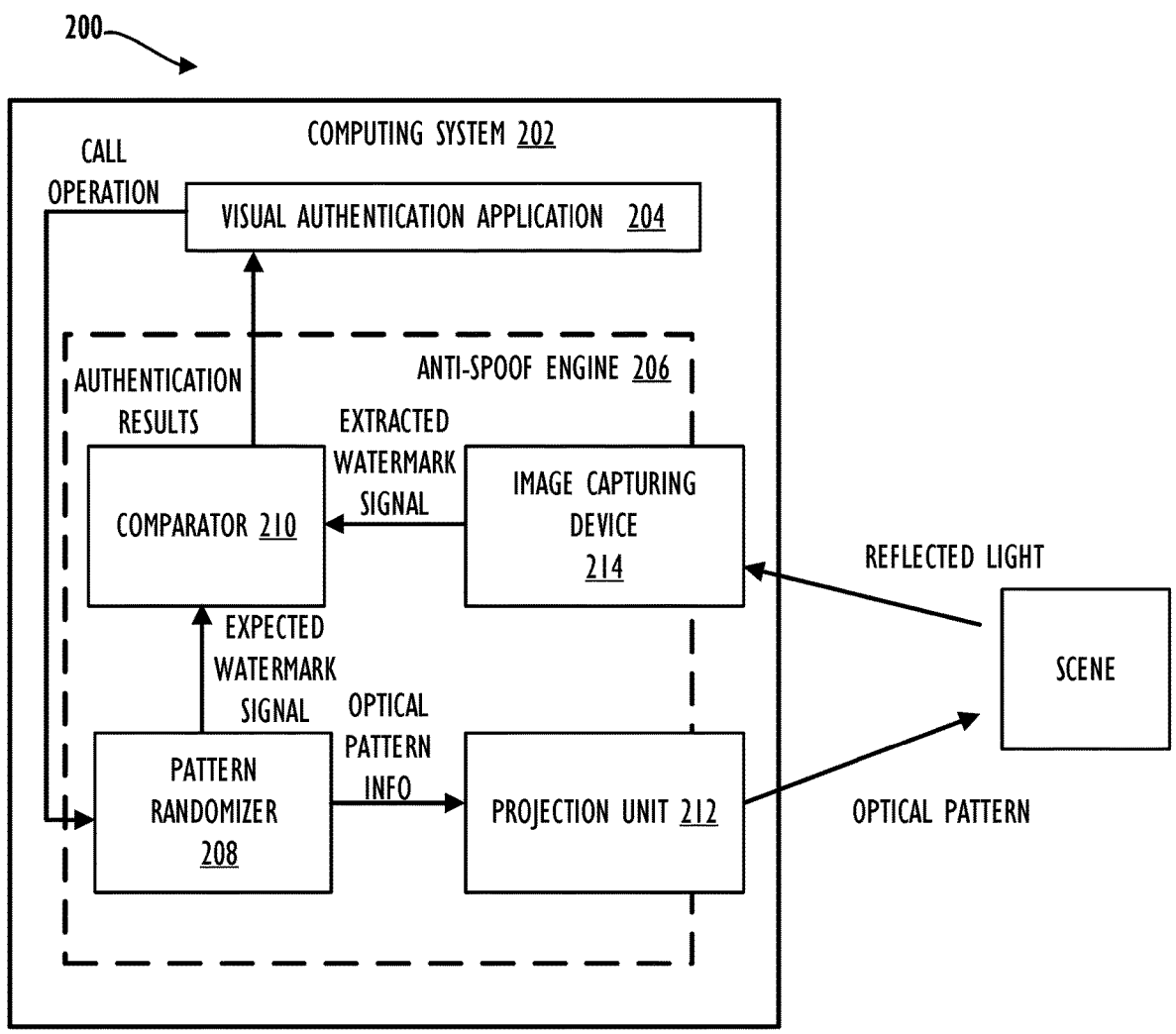
FIG. 2 is a schematic diagram of an embodiment of a computing system architecture configured to perform optical feedback using optical patterns for a visual recognition authentication.

FIG. 2 is a schematic diagram of an embodiment of a computing system architecture 200 configured to perform optical feedback using optical patterns for a visual recognition authentication. FIG. 2 illustrates that the computing system architecture 200 comprises a computing system 202 that includes a projection unit 212 and an image capturing device 214. Using FIG. 1 as an example, the computing system architecture 200 may be implemented in a TEE with trusted network devices. In particular, the application computing system 202 may be implemented using one or more of the mobile devices (e.g., mobile phones 110, laptops 112, and tablets 114), computer servers 104, computers 106, and/or electronic devices capable of connecting to computer network 102 and/or cellular network 103 shown in FIG. 1. Although FIG. 2 illustrates that a portion of the image processing handled by the projection unit 212 and image capturing device 214 are implemented as part of the anti-spoof engine 206, other embodiments of the computing system architecture 200 may have the image processing elements of the projection unit 212 and/or image capturing device 214 implemented using a separate engine within the trusted environment (e.g., TEE). Additionally, other embodiments of the computing system architecture 200 may combine one or more of the computing system components into a single system component. Using FIG. 2 as an example, rather than implementing the comparator 210 and pattern randomizer 208 as separate components, other embodiments may have comparator 210 and pattern randomizer 208 combined into a single component.

The computing system 202 is configured to perform optical feedback using an anti-spoof engine 206 during a visual authentication session. The anti-spoof engine 206 may be a trusted source that logically isolates itself from the visual authentication application 204 and prevents the visual authentication application 204 from accessing protected content, such as the list of available optical patterns. In one embodiment, to logically isolate the anti-spoof engine 206 from the visual authentication application 204, the anti-spoof engine 206 is implemented using a separate hardware security and management engine, such as Intel's Manageability Engine (ME), and interfaces with the visual authentication application 204 via a controller interface, such as Intel's host-embedded controller interface (HECI). The term "security and management engine" can also be referred to as and is interchangeable within this disclosure with the term "trusted execution engine." The anti-spoof engine 206 may also be isolated from the visual authentication application 204 using other TEE technology, such as secure enclaves (e.g., Intel's SGX technology).

The visual authentication application 204 may be configured to perform a variety of visual authentication operations, such as biometric authentication and/or analyzing a user's gestures, within a visual authentication session. Prior to performing the visual authentication operations, the visual authentication application 204 may call the anti-spoof engine 206 to generate one or more optical watermark signals that the projection unit 212 may emit into the scene in order to authenticate an image source. The call from the visual authentication application 204 may occur prior to starting the visual authentication session and/or during the visual authentication session (e.g., at the start of the visual authentication session). For example, the visual authentication application 204 may send the call instruction to the anti-spoof engine 206 when a user is at a login screen of the computing system 202 and/or a user has sent a request to the computing system 202 indicating the user's desire to access a secure site. In these instances, the call instruction can be sent prior to the computing system 202 prompting the user and/or providing instructions to the user regarding the visual authentication process.

After receiving the application call, the anti-spoof engine 206 may subsequently provide one or more optical patterns to the projection unit 212 to emit as one or more optical watermark signals during the visual authentication session. In one embodiment, the anti-spoof engine 206 may instruct and cause the projection unit 212 to emit the optical watermark signals for a portion of the visual authentication session by emitting a single optical watermark signal for a time duration that is less than the visual authentication session, aperiodically emit one or more optical watermark signals, periodically emit one or more optical watermark signals, or emit one or more optical watermark signals based on certain visual authentication events that occur within the visual authentication session. In another embodiment, the anti-spoof engine 206 may instruct and cause the projection unit 212 to emit one or more optical watermark signals continuously for the entire duration of the visual authentication session.

As shown in FIG. 2, the anti-spoof engine 206 comprises a pattern randomizer 208 and a comparator 210 to generate an optical watermark signal for the optical feedback during a visual authentication session. After being called by the visual authentication application 204, the pattern randomizer 208 may select one or more optical patterns from multiple potential optical patterns to project into a scene. In one embodiment, the pattern randomizer 208 may select the optical patterns randomly from a list of potential optical patterns in order to increase the difficulty for an attacker to predict the generated optical patterns. In other embodiments, the pattern randomizer 208 may use other known selection algorithms, such as performing a round-robin selection and/or a selection operation based on weight or ranked optical patterns. A selection operation based on weight or ranked optical patterns may assign weights or rank optical patterns based on a variety of factors such as complexity and/or processing efficiency. If the visual authentication session is for a highly confidential and restricted site or information, the pattern randomizer 208 may rank and/or heavily weight optical patterns that are more complex to enhance security authentication. Conversely, if the visual authentication session is for a relatively less important and/or secure restricted site or information, the pattern randomizer 208 may rank and/or heavily weight optical patterns that are less complex in order to improve processing efficiency. Additionally or alternatively, the pattern randomizer 208 may be a pseudo-random pattern or a pattern sequence based on one or more parameters of a scene (e.g., the brightness and/or lighting conditions).

The number of optical patterns randomly selected by the pattern randomizer 208 may be based on the time duration of the visual authentication session and/or the optical emission modes (e.g., periodic emission or event based emission). For example, if the entire duration of the visual authentication session is about three seconds and the emission duration of the optical watermark signal is also about three seconds, then the pattern randomizer 208 may randomly select one optical pattern for the optical watermark signal. In instances where the anti-spoof engine 206 instructs the projection unit 212 to emit an optical watermark signal based on periodic optical emission mode, the pattern randomizer 208 may randomly select more than one optical pattern. For example, if the visual authentication session is long enough for five different periods, then the pattern randomizer 208 may select different optical patterns for transmission at each of the different periods. The pattern randomizer 208 may select the optical patterns by random in order to generate unpredictable optical watermark signals.

An optical pattern may include one or more geometric shapes arranged using one or more different layouts. This disclosure is not limited to a specific examples of optical patterns presented herein, but instead could include a variety of other types of optical patterns. The arrangement of the geometric shapes used to create the optical patterns may vary in complexity depending on a variety of factors, such as desired level of optical watermark protection, allocation of computing resources, and/or desired processing speeds of the optical watermark signals. For example, the arrangement of the geometric shapes may be a relatively simple optical pattern, where a single geometric shape is statically spaced at a predetermined distance (e.g., a two dimensional (2D) grid of dots or pattern of lines). Alternatively, the arrangement of geometric shapes may produce a special pattern that is relatively more complex (e.g., a picture of a predetermined scene). Optical patterns that are relatively simple may be more efficient and quicker to process than relatively more complex optical patterns and the relatively more complex optical patterns may provide more security than relatively simpler optical patterns. In one embodiment, the optical patterns may be configured to encode information corresponding to one or more different types of data elements. For example, if the optical pattern is a 2D grid of dots projected into the scene, data element information may be encoded within the optical pattern based on using different grid spacing.

After the pattern randomizer 208 selects the desired optical patterns for generating the optical watermark signals, the pattern randomizer 208 may provide the optical pattern information to the projection unit 212. In one embodiment, the projection unit 212 may comprise a light source and a controller (both not shown in FIG. 2) to generate the optical pattern within an optical watermark signal. The controller, which may be part of the trusted environment, receives the optical pattern information from the pattern randomizer 208 and subsequently uses the optical pattern information to configure the light source to generate light that produce the optical patterns. Examples of light sources that could be used to generate optical watermark signals include, but are not limited to high-current, low voltage light emitting diodes (LEDs), xenon-based light sources, and lasers. The light source may project the optical watermark signals using wavelengths of light outside the range of visible light. For example, the light source may project optical watermark signals that have wavelengths greater than about 700 nm and/or less than about 400 nm.

After the projection unit 212 projects the optical watermark signal into the scene, the image capturing device 214 captures a scene that includes the reflected optical watermark signal to generate an image source. The image capturing device 214 may include one or more image sensors (not shown in FIG. 2) that detect for the reflected optical watermark signal within the image source. For example, the image sensors are capable of detecting wavelengths of light in the range of about 350 nm to 1000 nm. To obtain the reflected optical watermark signal, the image capturing device 214 may filter out wavelengths of light used to emit the optical watermark signal (e.g., filter out infrared light). The image capturing device 214 could then convert the filtered out light into the electrical domain to form an extracted watermark signal. The image capturing device 214 may also include a controller (not shown in FIG. 2) that performs additional image processing on the extracted watermark signal and forwards the extracted watermark signal to the comparator 210.

As shown in FIG. 2, the comparator 210 receives the extracted watermark signal and the expected watermark signal from the pattern randomizer 208. After receiving the extracted watermark signal, the comparator 210 compares the reflected watermark signal with the expected watermark signal to determine if a match occurs and provides the authentication results to the visual authentication application 204. If, based on the authentication results the expected watermark signal is mismatched with the expected watermark signal, the visual authentication application 204 may perform a variety of functions, such as aborting the authentication process, request the user to start a new authentication session because the previous authentication session failed, and/or deny the user access to the computing system. In instances where the anti-spoof engine 206 fails to detect an extracted watermark signal, the comparator 210 may output the authentication result indicating a mismatch and/or notify the visual authentication application 204 that anti-spoof engine 206 was unable to obtain an extracted watermark signal. If the authentication results from comparator 210 indicate that the extracted watermark signal matches the expected watermark signal, then the visual authentication application 204 may continue with the visual authentication operation, such as proceeding to authenticate the biometric elements within the image source. For a single visual authentication session, the comparator 210 may be configured to compare one or more different optical patterns.

Figure 3:
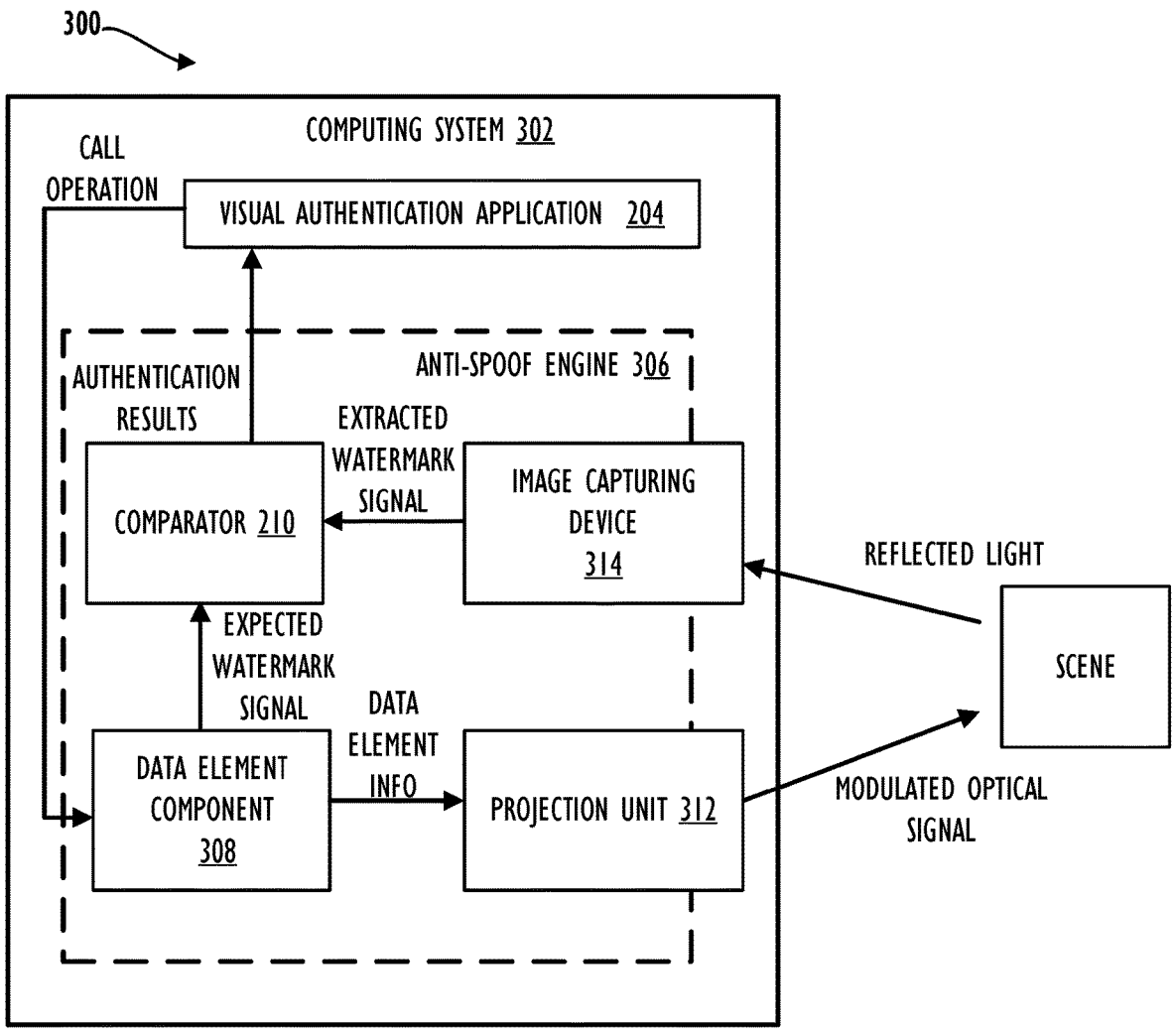
FIG. 3 is a schematic diagram of an embodiment of a computing system architecture configured to perform optical feedback using a modulated optical signal for a visual authentication session.

FIG. 3 is a schematic diagram of an embodiment of a computing system architecture 300 configured to perform optical feedback using a modulated optical signal for a visual authentication session. Computing system 302 is similar to computing system 202 except that computing system 302 is configured to generate an optical watermark signal with a modulated optical signal. Similar to computing system 202, for a given visual authentication sessions, the computing system 302 may emit a one or more optical watermark signals at one or more time durations. For example, for a visual authentication session, the computing system 202 may emit a first optical watermark signal for a duration of about a second, a second optical watermark signal for a duration of about two seconds, and a third optical watermark signal for a duration of about three seconds. Generally, emitting optical watermarks signals for shorter durations may decrease the likelihood and increase the cost of compromising optical watermark signals.

In FIG. 3, when the visual authentication application 204 calls the anti-spoof engine 306, the anti-spoof engine 306 may use a data element component 308 to obtain one or more data elements, such as such as timestamp information, geolocation coordinates (e.g., GPS coordinates), unique computer identifiers, and/or randomly generated numbers. Encoding data element information acts as watermarks used to authenticate images obtained from a visual authentication session. In one embodiment, the data element component 308 may be configured to obtain dynamic information (e.g., geolocation coordinates and timestamp information) from outside the trusted environment (e.g., server or memory outside of the trusted environment) and store the data element information within a buffer. Additionally or alternatively, the data element component 308 may have been previously preconfigured with the information during manufacturing of the computer system 202 (e.g., unique computer identifier). Additionally or alternatively, the data element component 308 may be configured as a data element generator to randomly generate data element information (e.g., random numbers). Randomly generating data element information, such as random numbers may improve watermark security because attackers are less likely to predict the generated optical watermark signal. In one embodiment, the data element component 308 may generate random numbers using central processing unit (CPU) based random number generators, such as Digital Random Number Generator (DRNG) and/or RDRAND found within Intel®'s CPU.

FIG. 3 illustrates that the data element component 308 provides the data element information to the projection unit 312. Afterwards, the projection unit 312 uses the data element information to generate a modulated optical signal. Similar to the projection unit 212 shown in FIG. 2, the projection unit 312 may comprise a light source and a controller (not shown in FIG. 3. The light source may be similar to the light source for projection unit 212 except that the light source may emit the modulated optical signal as visible light to a user. In certain instances, when the computing system 300 is a laptop, a mobile device, or other electronic connected to a display device, the white background light produced from login screen may provide sufficient luminosity to emit the modulated optical signal even in dark conditions. In one embodiment, the modulated optical signal may be an amplitude-based modulated optical signal that varies the amplitude of the optical signal in order to encode the data element information. Other embodiments may have the projection unit 312 perform frequency and/or phase modulation to encode the data element information. The projection unit 312 may then emit an optical watermark signal that includes the modulated optical signal.

The image capturing device 314 may then capture the reflected optical watermark signal that includes the modulated optical signal. To detect for the modulated optical signal within the reflected optical watermark signal, the image capturing device 314 may include one or more modulation sensors (not shown in FIG. 3). For example, the modulation sensor may be an ambient light sensor, an auxiliary sensor and/or other type image sensor that detects the modulated pulses in the modulated optical signal. The modulated sensors may also be configured to convert the reflected optical watermark signal into the electrical domain for comparison and perform image processing operations, such as filtering and decoding, to produce the extracted watermark signal. Similar to FIG. 2, in FIG. 3, the comparator compares the extracted watermark signal and expected watermark signal to produce authentication results that are supplied back to the visual authentication application 204.

Figure 4:
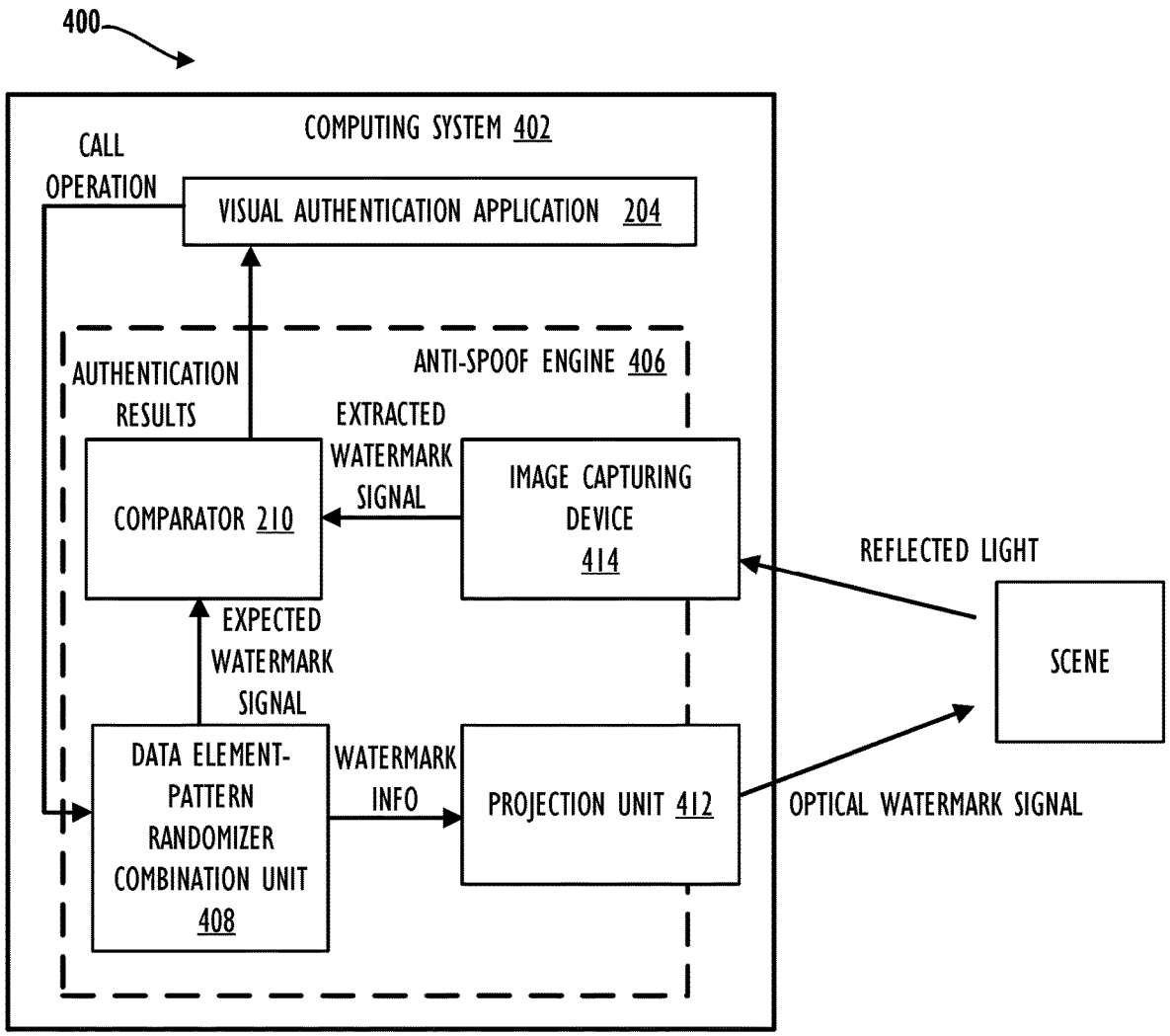
FIG. 4 is a schematic diagram of an embodiment of a computing system architecture configured to perform optical feedback using optical patterns and modulated optical signals for a visual authentication session.

FIG. 4 is a schematic diagram of an embodiment of a computing system architecture 400 configured to perform optical feedback using optical patterns and modulated optical signals for a visual authentication session. Computing system 402 is similar to computing system 302 except that computing system 402 is able to generate an optical watermark signal that includes, an optical pattern, a modulated optical signal, or both. As shown in FIG. 4, the anti-spoof engine 406 may include a data element-pattern randomizer combination unit 408 that is able to randomly select one or more optical patterns and/or encode data element information within the optical pattern and/or modulated optical signals. Similar to the anti-spoof engine 306 in FIG. 3, the data element-pattern randomizer combination unit 408 may provide the watermark information to the projection unit 412 such that the projection unit 412 emits an optical watermark signal that includes the optical pattern and the modulated optical signal.

In one embodiment, the projection unit 412 may include one light source that projects the modulated optical signal similar to the light source described for the projection unit 312 shown in FIG. 3 and a separate light source that that emits the optical pattern similar to the light source described for projection unit 212 shown in FIG. 2. Other embodiments of the projection unit 412 may have the single light source that emits both the modulated optical signal and the optical pattern, where the modulated optical signal and the optical pattern are emitted at the same and/or different wavelengths. Afterwards, the image capturing device 414 may capture and extract the optical watermark signal for comparison. Similar to FIGS. 2 and 3, the image capturing device 414 may include one or more sensors that detect the modulated optical signal and optical pattern within the reflected optical watermark signal and convert the reflected optical watermark signal into the electrical domain for comparison.

Figure 5:
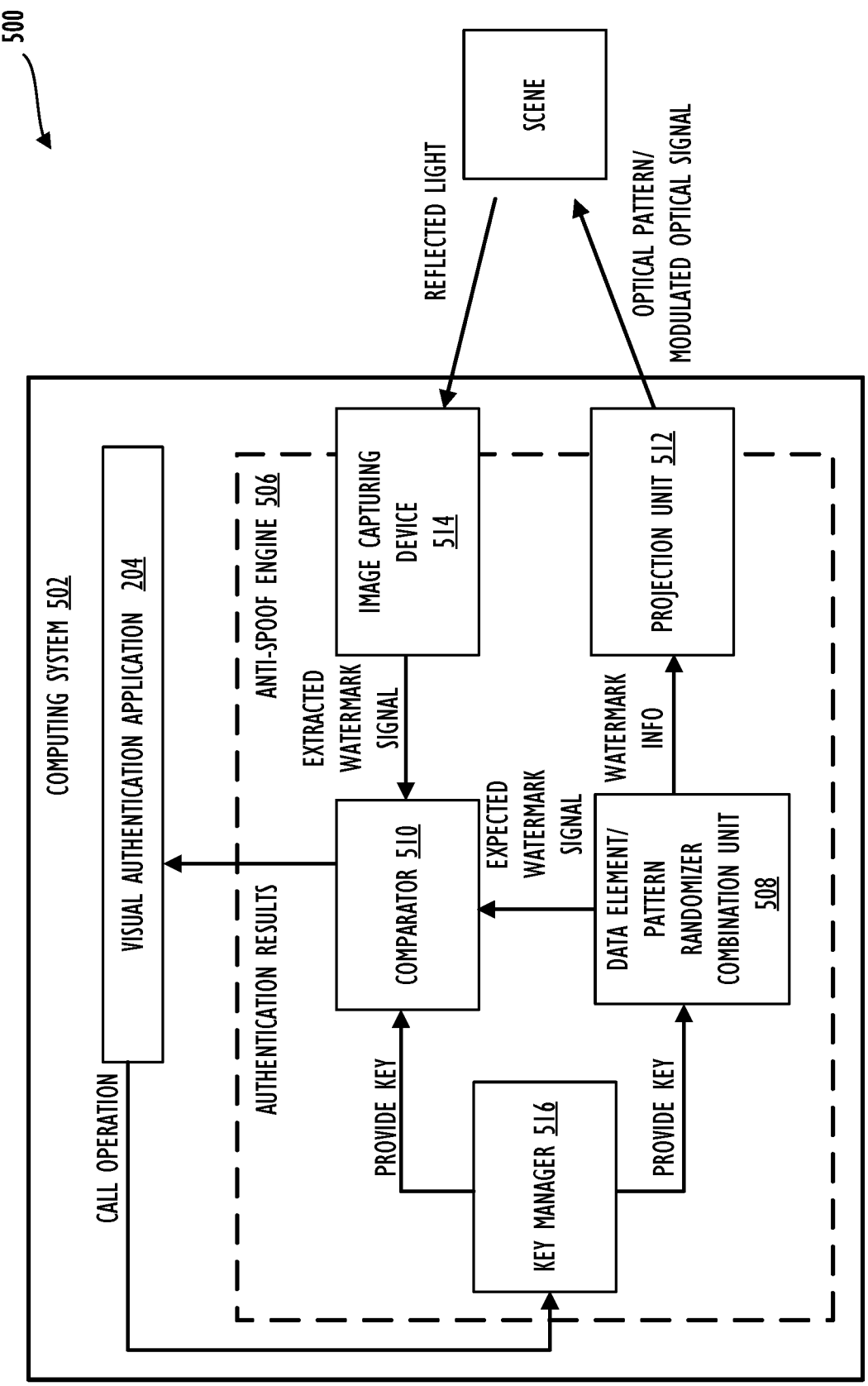
FIG. 5 is a schematic diagram of an embodiment of a computing system architecture configured to produce secure optical patterns and/or modulated optical signals for a visual authentication session.

FIG. 5 is a schematic diagram of an embodiment of a computing system architecture 500 configured to produce secure optical patterns and/or modulated optical signals for a visual authentication session. The computing system 502 is similar to computing system 402 shown in FIG. 4 except that the anti-spoof engine 506 includes a key manager 516 that produces one or more keys to encrypt and/or generate hash values for at least some of the watermark information. For example, the anti-spoof engine 506 may generate hash values and/or encrypt data element information and/or other information to generate the optical pattern. To produce an optical watermark signal, the visual authentication application 204 may call the anti-spoof engine 506, which then instructs a key manager 516 to release one or more security keys associated with producing a secure optical watermark signal.

The key manager 516 may store one or more security keys using a trusted environment, such as a TEE that implemented using hardware (e.g., Intel's ME) and/or software that is not exposed to an operating system (OS) software stack and/or visual authentication application 204. In one embodiment, the security keys may be provisioned based on a shared secret between one more devices. For example, a security key may be a shared security key, such as an OTP sequence that allow for watermark sequence to be predictable only to recipients whom have the pre-shared secret. Another example of security keys could be security keys that were set previously in a secure factory environment and locked before finishing the construction of the computing system 502. The security keys may be shared with the data element/pattern randomizer unit 508 and comparator 510 after the visual authentication application 204 calls the anti-spoof engine 506.

The data element/pattern randomizer combination unit 508 may receive the security keys from the key manager 516 to generate secure watermark information. In one embodiment, after randomly selecting the optical pattern and determining the data element information to encode within the optical watermark signal, the data element/pattern randomizer combination unit 508 may use the security key to generate hash values for the secure watermark information, such as the data element information. The data element/pattern randomizer combination unit 508 may generate hash values using a hashing algorithm known by persons of ordinary skill in the art, such as Secure Hash Algorithm 2 (SHA-2), message-digest 5 (MD5), and Secure Hash Algorithm 3 (SHA-3). Certain data element information may also be encrypted and/or signed using the security keys received from the key manager 516. For example, timestamp information may be cryptographically signed using the security keys. After hashing and/or encrypting data element information and/or optical pattern information, the data element/pattern randomizer unit 508 may send the optical pattern and/or data element information to the projection unit 512 for projecting the optical watermark signal.

Similar to other image capture devices described in FIGS. 2-4, the image capturing device 514 captures the reflected optical watermark signal and converts the reflected optical watermark signal to an extracted watermarks signal within the electrical domain. The comparator 510 may then decode and validate the extracted watermark signal. The comparator 510 may use the security keys from the key manager 516 to decode the extracted watermark signal to its actual extracted watermark values. The comparator 510 may then compare the actual extracted watermark values to the expected watermark signal to determine whether a match occurs. After performing the comparison, comparator 510 may provide the authentication results to the visual authentication application 204.

Although FIGS. 2-5 illustrate a specific embodiments of computing system architectures 200, 300, 400, and 500, the disclosure is not limited to the specific embodiment illustrated in the figures. For instances, embodiments of the present disclosure may separate out one or more of the computing system components. For example, the projection units 212, 312, 412, and 512 and/or image capturing devices 214, 314, 414, and 514 may be separate and independent from the anti-spoof engines 206, 306, 406, and 506 that may be located on one or more remote devices. For example, the projection units 212, 312, 412, and 512 and/or image capturing devices 214, 314, 414, and 514 may be devices that are externally connected, such as externally wired and/or wireless connections, to the computing system 202, 302, 402, and 502. In this instance, the computing system 202, 302, 402, and 502 may remotely receive the captured image from the image capturing devices. Additionally, rather than using a single anti-spoof engine that manages both the emission and extraction of the optical watermark signals, other embodiments may use more than one anti-spoof engines, where each anti-spoof engine manages a portion of the optical watermark signal processing. For example, one anti-spoof engine may be configured to generate and cause emission of the optical watermark signal and a second anti-spoof engine may be configured to receive the reflected optical watermark signal and extract the watermark signal. The different anti-spoof engines may also be located on separate computing systems, for example, on separate trusted network devices. The use and discussion of FIGS. 2-5 are only examples to facilitate ease of description and explanation.

Figure 6:
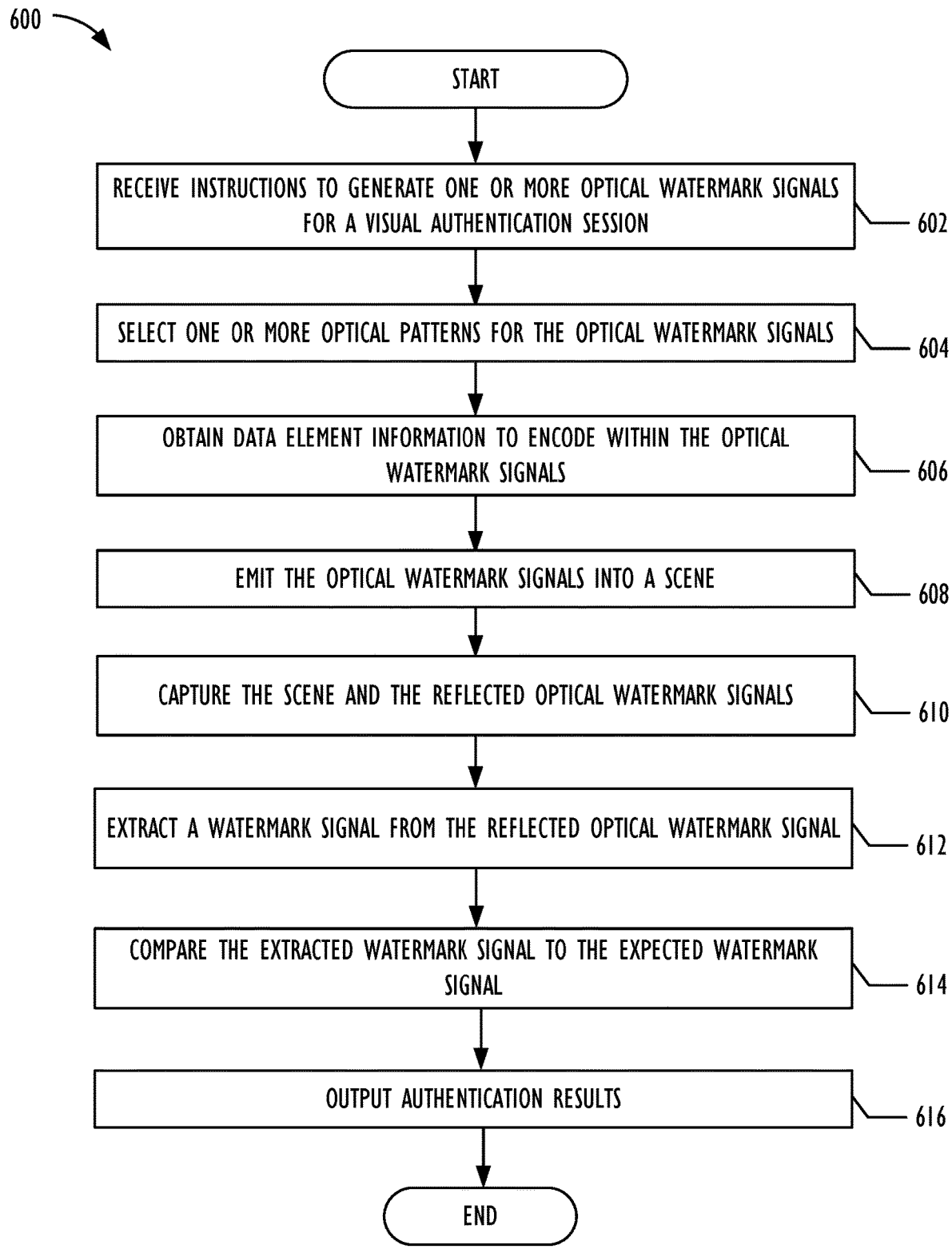
FIG. 6 is a flow chart of an embodiment of a method that generates an optical watermark signal for a visual authentication session.

FIG. 6 is a flow chart of an embodiment of a method 600 that generates an optical watermark signal for a visual authentication session. Using FIGS. 2-5 as an example, method 600 may be implemented using the computer system 202, 302, 402, and/or 502. In particular, method 600 may be implemented using at least the anti-spoof engines 206, 306, 406, and/or 506 that operates as a trusted environment that isolates itself from the execution instructions of the visual authentication application 204. Method 600 may perform operations relating to the anti-spoof engines 206, 306, 406, and/or 506 using hardware, software, or combination thereof.

Method 600 may start at block 602 to receive instructions to generate one or more optical watermark signals for a visual authentication session. In one embodiment, method 600 may receive a call instruction from a visual authentication application that notifies method 600 that a video authentication session prior to the start and/or when the video authentication session is currently active. Method 600 may then move to block 604 and select one or more optical patterns for the optical watermark signals. Method 600 may generate a single optical watermark signal or multiple optical watermark signals for the entire visual authentication session. For example, method 600 may generate multiple optical watermark signals when operating in a period, aperiodic, and/or event based optical emission modes. In one embodiment, method 600 may randomly select the optical patterns from a list of potential optical patterns in order to decrease the likelihood of an attacker predicting the optical pattern. Other embodiments may select the optical patterns using other selection processes, such as round-robin selection process or a weighted selection process.

Method 600 may then continue to block 606 and obtain data element information to encode within the optical watermark signals. The data elements may include timestamp information, a unique computer ID, and/or randomly generated numbers. In one embodiment, at block 606, method 600 may receive one or more security keys to create hash values and/or encrypt the data element information. Method 600 may then proceed to block 608 and emit the optical watermark signals into a scene. Method 600 may emit one optical watermark signal at any point in time of the visual authentication session. Each optical watermark signal may include an optical pattern, modulated optical signal, or both. Method 600 may use one or more wavelengths of light to emit each of the optical watermark signal. For example, an optical watermark signal may include both an optical pattern and modulated optical signal. Method 600 may emit an optical pattern using a wavelength of light located in the infrared range while the modulated optical signal is produced from visible light.

Once method 600 emits the optical watermarks signals, method 600 may then move to block 610 and capture the scene and the reflected optical watermark signals. Method 600 may use one or more image sensors that are able to detect the wavelengths of light used to emit the optical watermark signal. Method 600 may then move to block 612 and extract a watermark signal from the reflected optical watermark signal. At block 612, method 600 may covert the captured reflected optical watermark into the electrical domain and performing other image processing operations. Afterwards, the method 600 moves to block 614 and compares the extracted watermark signal to the expected watermark signal. If the data element information was encrypted and/or encoded as hash values, method 600 may first decode and decrypt the extracted watermark signal prior to the comparison process. Method 600 then moves to block 616 and outputs the authentication results produced from block 614. In one embodiment, method 600 may output the authentication results to a visual authentication application to perform additional visual authentication operations, such as denying a user access and/or abort any remaining visual authentication operations.

Figure 7:
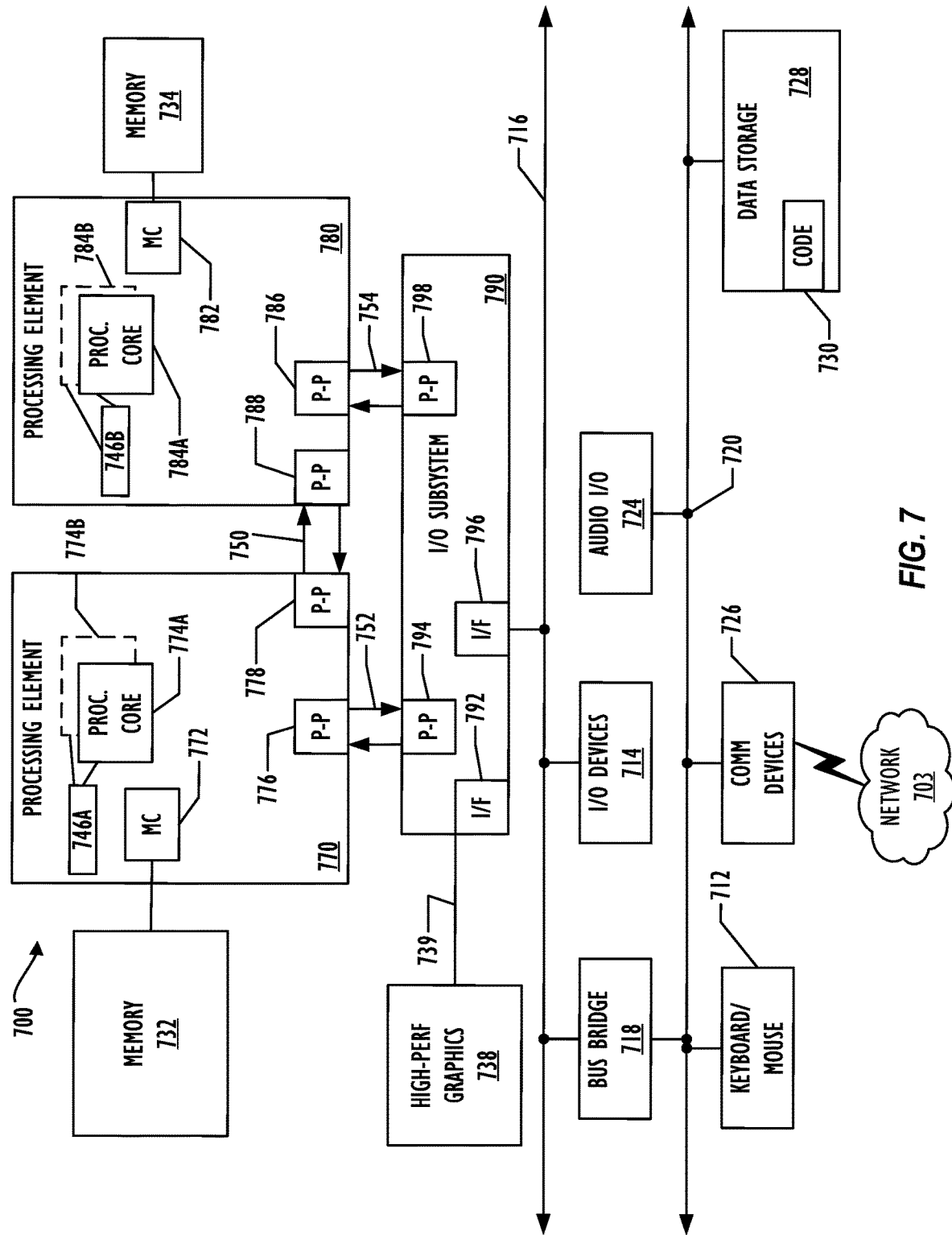
FIG. 7 is a block diagram illustrating an embodiment of a computing device for use with techniques described herein.

Referring now to FIG. 7, a block diagram illustrates a programmable device 700 that may be used for implementing the techniques described herein in accordance with one or more embodiments (e.g., computing system architecture 300, 400, and 500 and method 600). The programmable device 700 illustrated in FIG. 7 is a multiprocessor programmable device that includes a first processing element 770 and a second processing element 780. While two processing elements 770 and 780 are shown, an embodiment of programmable device 700 may also include only one such processing element.

Programmable device 700 is illustrated as a point-to-point interconnect system, in which the first processing element 770 and second processing element 780 are coupled via a point-to-point interconnect 750. Any or all of the interconnects illustrated in FIG. 7 may be implemented as a multi-drop bus rather than point-to-point interconnects.

As illustrated in FIG. 7, each of processing elements 770 and 780 may be multicore processors, including first and second processor cores (i.e., processor cores 774a and 774b and processor cores 784a and 784b). Such cores 774a, 774b, 784a, 784b may be configured to execute computing instruction code. However, other embodiments may use processing elements that are single core processors as desired. In embodiments with multiple processing elements 770, 780, each processing element may be implemented with different numbers of cores as desired.

Each processing element 770, 780 may include at least one shared cache 746. The shared cache 746a, 746b may store data (e.g., computing instructions) that are utilized by one or more components of the processing element, such as the cores 774a, 774b and 784a, 784b, respectively. For example, the shared cache may locally cache data stored in a memory 732, 734 for faster access by components of the processing elements 770, 780. In one or more embodiments, the shared cache 746a, 746b may include one or more mid-level caches, such as level 2 (L2), level 3 (L3), level 4 (L4), or other levels of cache, a last level cache (LLC), or combinations thereof.

While FIG. 7 illustrates a programmable device with two processing elements 770, 780 for clarity of the drawing, the scope of the present invention is not so limited and any number of processing elements may be present. Alternatively, one or more of processing elements 770, 780 may be an element other than a processor, such as an graphics processing unit (GPU), a digital signal processing (DSP) unit, a field programmable gate array, or any other programmable processing element. Processing element 780 may be heterogeneous or asymmetric to processing element 770. There may be a variety of differences between processing elements 770, 780 in terms of a spectrum of metrics of merit including architectural, microarchitectural, thermal, power consumption characteristics, and the like. These differences may effectively manifest themselves as asymmetry and heterogeneity amongst processing elements 770, 780. In some embodiments, the various processing elements 770, 780 may reside in the same die package.

First processing element 770 may further include memory controller logic (MC) 772 and point-to-point (P-P) interconnects 776 and 778. Similarly, second processing element 780 may include a MC 782 and P-P interconnects 786 and 788. As illustrated in FIG. 7, MCs 772 and 782 couple processing elements 770, 780 to respective memories, namely a memory 732 and a memory 734, which may be portions of main memory locally attached to the respective processors. While MC logic 772 and 782 is illustrated as integrated into processing elements 770, 780, in some embodiments the memory controller logic may be discrete logic outside processing elements 770, 780 rather than integrated therein.

Processing element 770 and processing element 780 may be coupled to an I/O subsystem 790 via respective P-P interconnects 776 and 786 through links 752 and 754. As illustrated in FIG. 7, I/O subsystem 790 includes P-P interconnects 794 and 798. Furthermore, I/O subsystem 790 includes an interface 792 to couple I/O subsystem 790 with a high performance graphics engine 738. In one embodiment, a bus (not shown) may be used to couple graphics engine 738 to I/O subsystem 790. Alternately, a point-to-point interconnect 739 may couple these components.

In turn, I/O subsystem 790 may be coupled to a first link 716 via an interface 796. In one embodiment, first link 716 may be a Peripheral Component Interconnect (PCI) bus, or a bus such as a PCI Express bus or another I/O interconnect bus, although the scope of the present invention is not so limited.

As illustrated in FIG. 7, various I/O devices 714, 724 may be coupled to first link 716, along with a bridge 718 that may couple first link 716 to a second link 720. In one embodiment, second link 720 may be a low pin count (LPC) bus. Various devices may be coupled to second link 720 including, for example, a keyboard/mouse 712, communication device(s) 726 (which may in turn be in communication with the computer network 703), and a data storage unit 728 such as a disk drive or other mass storage device which may include code 730, in one embodiment. The code 730 may include instructions for performing embodiments of one or more of the techniques described above. Further, an audio I/O 724 may be coupled to second link 720.

Note that other embodiments are contemplated. For example, instead of the point-to-point architecture of FIG. 7, a system may implement a multi-drop bus or another such communication topology. Although links 716 and 720 are illustrated as busses in FIG. 7, any desired type of link may be used. In addition, the elements of FIG. 7 may alternatively be partitioned using more or fewer integrated chips than illustrated in FIG. 7.

Figure 8:
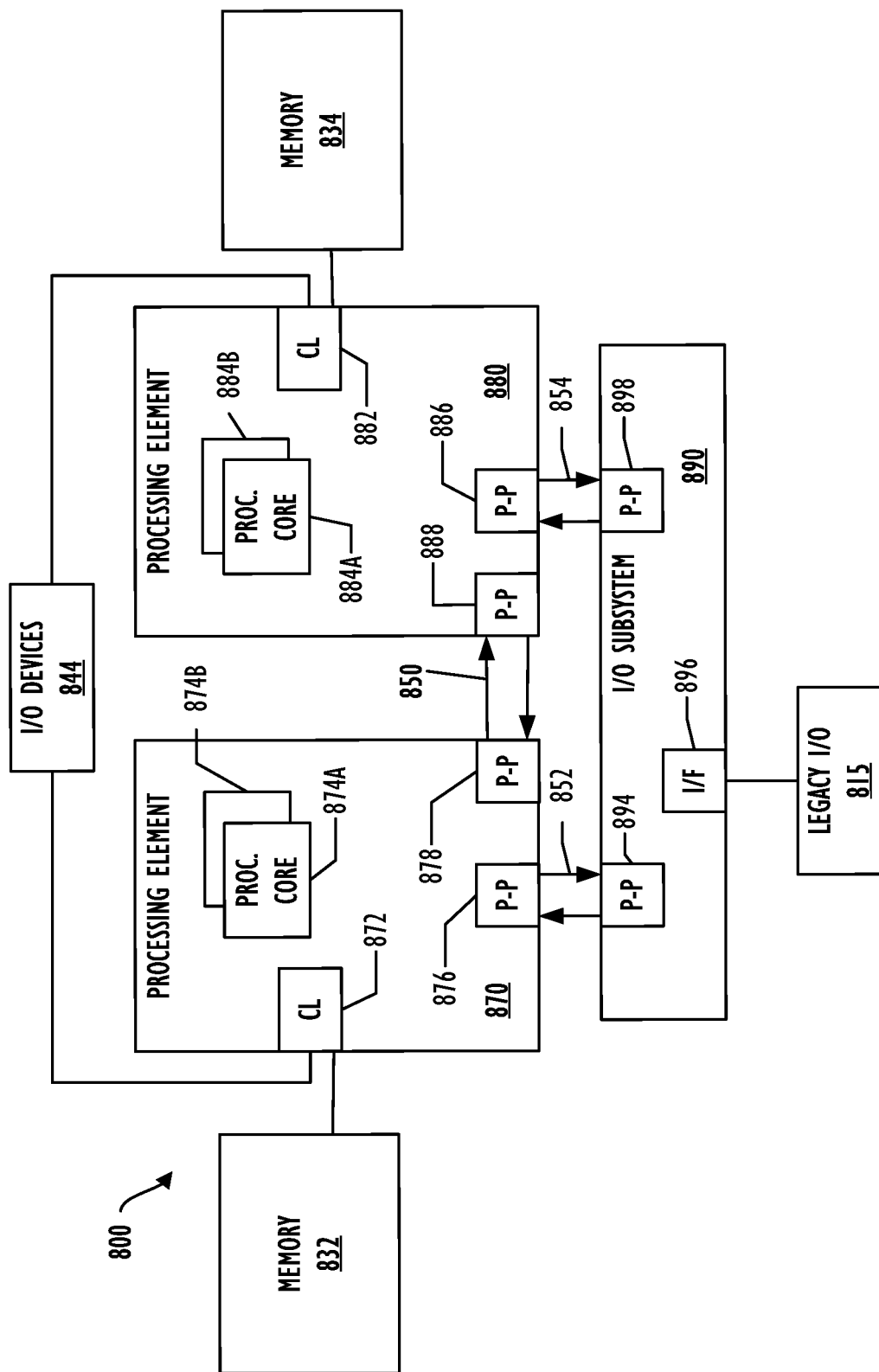
FIG. 8 is a block diagram illustrating another embodiment of computing device for use with techniques described herein.

Referring now to FIG. 8, a block diagram illustrates a programmable device 800 according to another embodiment. Certain aspects of FIG. 8 have been omitted from FIG. 8 in order to avoid obscuring other aspects of FIG. 8.

FIG. 8 illustrates that processing elements 870, 880 may include integrated memory and I/O control logic ("CL") 872 and 882, respectively. In some embodiments, the 872, 882 may include memory control logic (MC) such as that described above in connection with FIG. 8. In addition, CL 872, 882 may also include I/O control logic. FIG. 8 illustrates that not only may the memories 832, 834 be coupled to the CL 872, 882, but also that I/O devices 844 may also be coupled to the control logic 872, 882. Legacy I/O devices 815 may be coupled to the I/O subsystem 890 by interface 896. Each processing element 870, 880 may include multiple processor cores, illustrated in FIG. 8 as processor cores 874A, 874B, 884A and 884B. As illustrated in FIG. 8, I/O subsystem 890 includes point-to-point (P-P) interconnects 894 and 898 that connect to P-P interconnects 876 and 886 of the processing elements 870 and 880 with links 852 and 854. Processing elements 870 and 880 may also be interconnected by link 850 and interconnects 878 and 888, respectively.

The programmable devices depicted in FIGS. 7 and 8 are schematic illustrations of embodiments of programmable devices that may be utilized to implement various embodiments discussed herein. Various components of the programmable devices depicted in FIGS. 7 and 8 may be combined in a system-on-a-chip (SoC) architecture.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means ±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

The following examples pertain to further embodiments.

Example 1 is a machine readable medium on which instructions are stored, comprising instructions for preventing spoofing of visual authentication that when executed cause a machine to: generate an optical watermark signal for a visual authentication session, wherein the optical watermark signal includes at least one optical identifier to authenticate images captured during the visual authentication session; obtain an image source that includes captured images of the visual authentication session; determine whether the image source includes a reflected optical watermark signal; and compare whether the reflected optical watermark signal matches the generated optical watermark signal based on the determination that the image source includes the reflected optical watermark signal.

In Example 2, the subject matter of Example 1 can optionally include instructions, when executed, cause the machine to deny a user access to restricted information based on the determination that the reflected optical watermark signal does not match the generated optical watermark signal.

In Example 3, the subject matter of Examples 1 or 2 can optionally include instructions, when executed, cause the machine to abort the visual authentication session based on the determination that the reflected optical watermark signal does not match the generated optical watermark signal.

In Example 4, the subject matter of any preceding Examples can optionally include that the at least one optical identifier includes an optical pattern projected at a wavelength of light that is greater than 700 nanometers.

In Example 5, the subject matter of Example 4 can optionally include the instructions, when executed, cause the machine to randomly select the optical pattern from a plurality of potential optical patterns.

In Example 6, the subject matter of Example 4 can optionally include that the optical pattern encodes data element information indicative of watermarks.

In Example 7, the subject matter of any preceding Examples can optionally include that the at least one optical identifier includes a modulated optical signal.

In Example 8, the subject matter of Example 7 can optionally include that the modulated optical signal encodes data element information indicative of watermarks.

In Example 9, the subject matter of Example 8 can optionally include that the one or more data element information is encrypted as a hash value.

In Example 10, the subject matter of any preceding Examples can optionally include that the instructions are implemented within a hardware security and management engine.

Example 11 includes a system for preventing spoofing of visual authentication, comprising: at least one processor; and a memory, coupled to the at least one processor, and comprises instructions, when executed by the at least one processor, causes the system to: generate an optical watermark signal for a visual authentication session, wherein the optical watermark signal includes at least one optical identifier to authenticate images captured during the visual authentication session; obtain an image source that includes captured images of the visual authentication session; determine whether the image source includes a reflected optical watermark signal; and compare whether the reflected optical watermark signal matches the generated optical watermark signal based on the determination that the image source includes the reflected optical watermark signal.

In Example 12, the subject matter of Example 11 can optionally include the instructions when executed, cause the system deny a user to restricted information based on the determination that the reflected optical watermark signal does not match the generated optical watermark signal.

In Example 13, the subject matter of Examples 11 or 12 can optionally include that the at least one optical identifier includes an optical pattern projected at a wavelength of light that is greater than 700 nanometers.

In Example 14, the subject matter of Example 13 can optionally include the instructions, when executed, cause the system to randomly select the optical pattern from a plurality of potential optical patterns.

In Example 15, the subject matter of any of the Examples 11-13 can optionally include that the at least one optical identifier includes a modulated optical signal that encodes data element information indicative of watermarks.

In Example 16, the subject matter of Example 15 can optionally include that the modulated optical signal encodes data element information indicative of watermarks.

Example 17, includes a method for preventing spoofing of visual authentication, comprising: receiving, at a trusted execution engine, an instruction to perform visual authentication operations for a visual authentication session; generating, with the trusted execution engine, an optical watermark signal based on receiving the instruction, wherein the optical watermark signal includes at least one optical identifier to authenticate images captured during the visual authentication session; obtaining, with the trusted execution engine, an image source that includes captured images of the visual authentication session; determining, with the trusted execution engine, whether the image source includes a reflected optical watermark signal; and comparing, with the trusted execution engine, whether the reflected optical watermark signal matches the generated optical watermark signal based on the determination that the image source includes the reflected optical watermark signal.

In Example 18, the subject matter of Example 17 can optionally include denying a user access to restricted information based on the determination that the reflected optical watermark signal does not match the generated optical watermark signal.

In Example 19, the subject matter of Examples 17 or 18 can optionally include that the at least one optical identifier includes an optical pattern randomly selected with the anti-spoof engine from a list of potential optical patterns.

In Example 20, the subject matter of any of the Examples 17-19 can optionally include that the optical pattern is projected at a wavelength of light that is greater than 700 nanometers.

In Example 21, the subject matter of any of the Examples 17-20 can optionally include that the at least one optical identifier includes a modulated optical signal configured to encode one or more data element information indicative of watermarks.

Example 22 includes a programmable device for preventing spoofing of visual authentication, comprising: one or more programmable control devices; and a program storage device, coupled to the one or more programmable control devices, on which are stored computer instructions that when executed cause the one or more programmable control devices to: receive from a remote device a captured image for a visual authentication session; determine whether the image source includes a reflected optical watermark signal that includes at least one optical identifier for the visual authentication session; extract the at least one optical identifier from the captured image to generate an extracted watermark signal based on a determination that the image source includes the reflected optical watermark signal; and compare the extracted watermark signal with an expected watermark signal for the visual authentication session to determine whether the extracted watermark signal matches the expected watermark signal.

In Example 23, the subject matter of Example 22 can optionally include computer instructions, when executed cause the one or more programmable control devices to: transmit the expected watermark signal to the remote device; and instruct the remote device to project an optical watermark signal that includes at least one emission optical identifier based on the expected watermark signal.

In Example 24, the subject matter of Examples 22 or 23 can optionally include that the at least one optical identifier includes an optical pattern projected at a wavelength of light that is greater than 700 nanometers.

In Example 25, the subject matter of any of Examples 22-24 can optionally include that the at least one optical identifier includes a modulated optical signal configured to encode one or more data element information indicative of watermarks.

Example 26 includes a system for preventing spoofing of visual authentication comprising: at least one processor; and at least one memory, coupled to the at least one processor, and comprises instructions, when executed by the at least one processor, causes the system to perform the steps of the machine readable medium of any one of the Examples 1-10.

Example 27 includes an apparatus for preventing spoofing of visual authentication, comprising means to perform the steps of the machine readable medium of any one of the Examples 1-10.

Example 28 includes a method for preventing spoofing of visual authentication that performs the steps of the programmable device of any one of the Examples 22-25.

Example 29 includes an apparatus for preventing spoofing of visual authentication, comprising means to perform the steps of the programmable device of any one of the Examples 22-25.

Example 30 includes a system for offloading computing services comprising: at least one processor; and at least one memory, coupled to the at least one processor, and comprises instructions, when executed by the at least one processor, causes the system to perform the steps of the programmable device of any one of the Examples 22-25.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. At least one of a storage device or a storage disk comprising instructions to prevent visual authentication spoofing that, when executed, cause a machine to at least:
    select (a) a first data element from candidate data elements to encode into a first watermark during a first time period and (b) a second data element different from the first data element from the candidate data elements to encode into a second watermark during a second time period, the second time period different than the first time period;
    encrypt the first and second data elements with a security key;
    generate an optical signal for a visual authentication session, the optical signal including the first watermark during the first time period and the optical signal including the second watermark during the second time period; and
    determine whether a reflected optical signal matches the optical signal generated for the visual authentication session based on a determination that the reflected optical signal includes (a) the first data element during the first time period and (b) the second data element during the second time period, the first and second data elements decrypted with the security key.

2. The at least one storage device or storage disk of claim 1, wherein the security key is a shared security key based on a one time password sequence.

3. The at least one storage device or storage disk of claim 1, wherein the security key is set in a secure factory environment.

4. The at least one storage device or storage disk of claim 1, wherein the instructions, when executed, cause the machine to generate a first hash value for the first data element and a second hash value for the second data element using the security key.

5. The at least one storage device or storage disk of claim 1, wherein the instructions, when executed, cause the machine to deny a user access to restricted information based on a determination that the reflected optical signal does not match the optical signal generated for the visual authentication session.

6. The at least one storage device or storage disk of claim 1, wherein the instructions, when executed, cause the machine to abort the visual authentication session based on a determination that the reflected optical signal does not include (a) the first watermark during the first time period and (b) the second watermark during the second time period.

7. The at least one storage device or storage disk of claim 1, wherein the instructions, when executed, cause the machine to project at least one of the optical signals at a wavelength of light that is greater than 700 nanometers.

8. A system for preventing spoofing of visual authentication, comprising:
a processor; and
a memory, coupled to the processor, including instructions, that when executed by the processor, cause the system to:
select (a) a first data element from candidate data elements to encode into a first watermark during a first time period and (b) a second data element different from the first data element from the candidate data elements to encode into a second watermark during a second time period, the second time period different than the first time period;
encrypt the first and second data elements with a security key;
generate an optical signal for a visual authentication session, the optical signal including the first watermark during the first time period and the optical signal including the second watermark during the second time period; and
determine whether a reflected optical signal matches the optical signal generated for the visual authentication session based on a determination that the reflected optical signal includes (a) the first data element during the first time period and (b) the second data element during the second time period, the first and second data elements decrypted with the security key.

9. The system of claim 8, wherein the security key is shared security key based on a one time password sequence.

10. The system of claim 8, wherein the security key is set in a secure factory environment.

11. The system of claim 8, wherein the instructions, when executed, cause the system to generate a first hash value for the first data element and a second hash value for the second data element using the security key.

12. The system of claim 8, wherein the instructions, when executed, cause the system to deny a user access to restricted information based on a determination that the reflected optical signal does not match the optical signal generated for the visual authentication session.

13. The system of claim 8, wherein the instructions, when executed, cause the system to abort the visual authentication session based on a determination that the reflected optical signal does not include (a) the first watermark during the first time period and (b) the second watermark during the second time period.

14. The system of claim 8, wherein at least one of the optical signals is projected at a wavelength of light that is greater than 700 nanometers.

15. A method for preventing spoofing of visual authentication, comprising:
selecting, by executing an instruction with at least one processor, (a) a first data element from candidate data elements to encode into a first watermark during a first time period and (b) a second data element different from the first data element from the candidate data elements to encode into a second watermark during a second time period, the second time period different than the first time period;
encrypting, by executing an instruction with the at least one processor, the first and second data elements with a security key;
generating, by executing an instruction with the at least one processor, an optical signal for a visual authentication session, the optical signal including the first watermark during the first time period and the optical signal including the second watermark during the second time period; and
determining, by executing an instruction with the at least one processor, whether a reflected optical signal matches the optical signal generated for the visual authentication session based on a determination that the reflected optical signal includes (a) the first data element during the first time period and (b) the second data element during the second time period, the first and second data elements decrypted with the security key.

16. The method of claim 15, wherein the security key is shared security key based on a one time password sequence.

17. The method of claim 15, wherein the security key is set in a secure factory environment.

18. The method of claim 15, further including generating a first hash value for the first data element and a second hash value for the second data element using the security key.

19. The method of claim 15, further including denying a user access to restricted information in response to determining that the reflected optical signal does not match the optical signal generated for the visual authentication session.

20. The method of claim 15, further including aborting the visual authentication session in response to determining that the reflected optical signal does not include (a) the first watermark during the first time period and (b) the second watermark during the second time period.

\* \* \* \* \*